United States Patent Office 3,096,503
Patented July 2, 1963

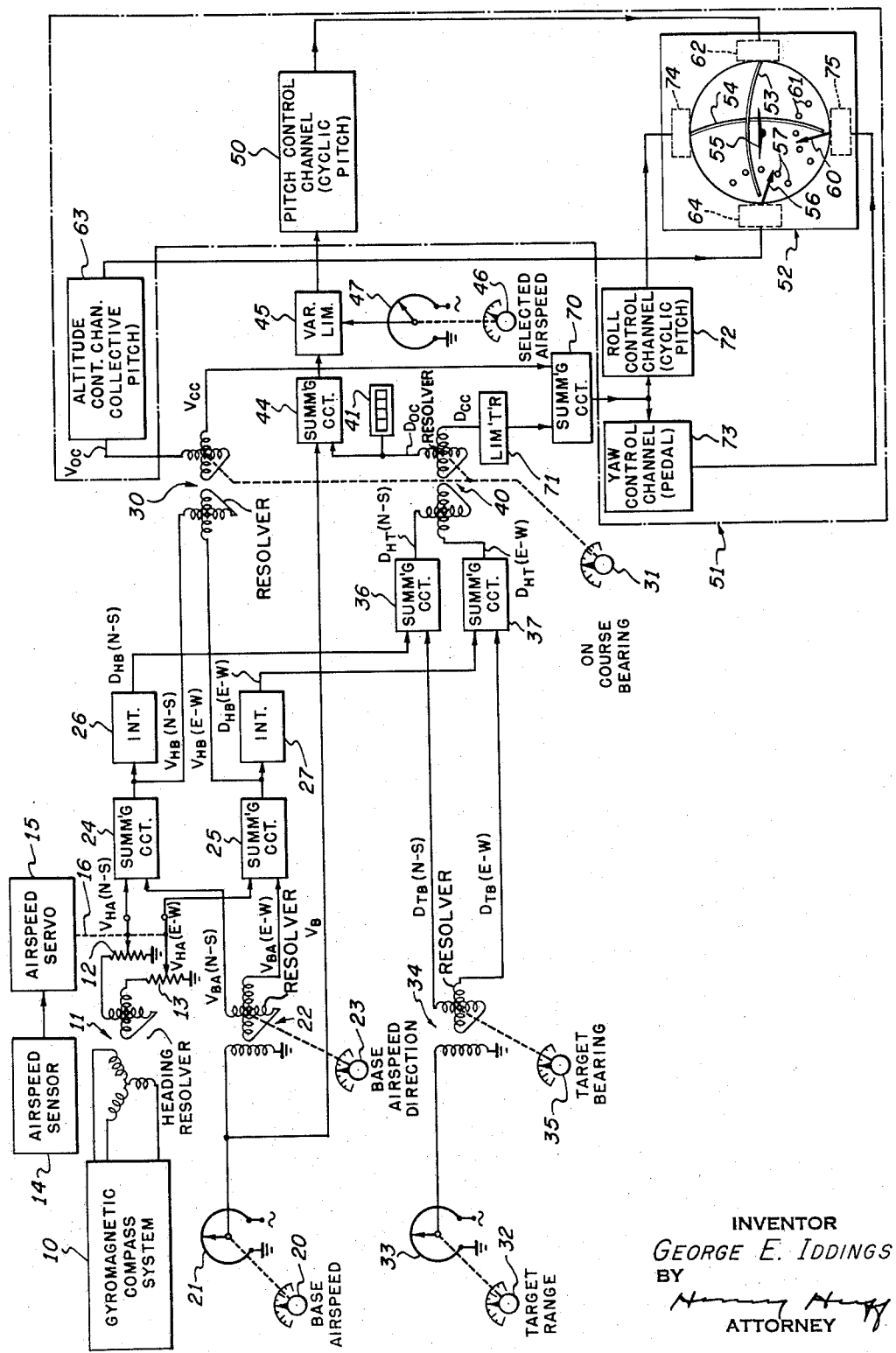

3,096,503
AIRCRAFT NAVIGATION SYSTEM
George E. Iddings, Wantagh, N.Y., assignor to Sperry Rand Corporation, Great Neck, N.Y., a corporation of Delaware
Filed Jan. 25, 1960, Ser. No. 4,243
9 Claims. (Cl. 340—26)

The present invention relates generally to aircraft control and navigation instrumentation. The invention is applied, for purposes of example, to a flight director type of navigational aid for manually piloted aircraft. However, it will be appreciated that the principles of the present invention may also be applied to a navigation system for automatically controlling the aircraft through suitable servo systems couped to actuate the aircraft's control elements.

The principles of the present invention are based generally on the principles disclosed in U.S. Patent No. 2,845,623 entitled Aircraft Navigation System issued July 29, 1958 to G. E. Iddings, and further include a navigation computing apparatus by means of which the air speed and/or altitude of an aircraft may be controlled along the route to a destination. In particular, the present invention concerns controlling the air speed and/or altitude in accordance with the distance from the craft to the destination which teaching is lacking in the prior art system.

It is a primary object of the present invention to provide an aircraft navigation system by means of which the air speed and/or altitude of the aircraft may be controlled along the route to a destination.

It is a further object of the present invention to provide an aircraft navigation system by means of which the air speed and/or altitude of the aircraft may be controlled along the route to a destination in accordance with the distance of the craft with respect to the destination.

It is an additional object of the present invention to provide an aircraft navigation system by means of which the aircraft may be controlled to fly at a predetermined constant air speed and/or altitude over an initial portion of the distance to the destination and thereafter gradually reduce the air speed and/or altitude to another predetermined air speed and/or altitude which latter condition may be zero ground speed and the altitude of a landing field at the destination or it may be, for example, when hovering with a rotary wing aircraft, an air speed equal and opposite to the wind velocity and a predetermined altitude above the destination.

The above objects are achieved in the present invention by an aircraft navigation system that utilizes a navigation computer of the dead reckoning type to provide signals representative of the on-course distance from the aircraft to the destination and of the air speed of the aircraft in the on-course direction. The on-course distance-to-destination signal is limited in accordance with a selected maximum air speed. The limited on-course distance-to-destination signal is used to control a flight director or a flight control system to command a change in aircraft condition in accordance with said signal. With the air speed of the craft limited as described, the velocity on-course signal is utilized to control the altitude of the aircraft by means of a flight director or flight control system. The aircraft will then be controlled to fly at a predetermined constant air speed and altitude over an initial portion of the total distance-to-destination until the on-course distance-to-destination signal goes below the established limit. Thereafter the aircraft will be controlled to fly at a gradually decreasing air speed and altitude in accordance with the decreasing distance to the destination until landing at which time the ground speeds will be zero and the altitude will be that of the destination.

Futher, if the aircraft is operating from a moving base, such as an aircraft carrier, the aircraft may be controlled to fly at the velocity of the base at the destination in order to maintain the aircraft at the same distance from the base although the base is moving. This feature is particularly advantageous in anti-submarine warfare maneuvers.

These as well as other objects and advantages will become apparent from the following description of the preferred embodiment of the invention illustrated in the schematic diagram wherein the invention is applied to a flight director navigation instrument applicable for rotary wing aircraft.

In the following description of the present invention as applied to the navigation of a helicopter, the helicopter rotor is preferably driven and maintained at a constant optimum r.p.m. through a suitable rotor r.p.m. control system, not shown. The present invention will be described with respect to a helicopter operating from a moving base such as an aircraft carrier with respect to a destination which may be a target, an airfield or a search position. For simplicity, the destination will be referred to in this case as a target.

Referring to the drawing, a gyromagnetic compass system 10 provides an output in the form of a magnetic field vector representative of the heading of the aircraft in which the compass system 10 and all of the below-mentioned equipment is mounted. The magnetic field vector is applied to the Y winding of a heading resolver 11 and is reproduced on the quadrature windings thereof to provide a signal on the vertical winding representative of the North-South component of the aircraft heading and a signal representative of the East-West component of the aircraft heading on the horizontal winding. The vertical winding of the heading resolver 11 is connected to the resistive winding of a potentiometer 12 while the horizontal winding is connected to the resistive winding of a potentiometer 13. The wiper arms of the potentiometers 12 and 13 are positioned in accordance with the air speed of the aircraft by means of an air speed servo 15. The air speed servo 15 is responsive to the air speed of the aircraft as sensed by an air speed sensor 14 and provides a rotation on its output shaft 16 proportional to the air speed. The shaft 15 is connected to the wiper arms of potentiometers 12 and 13 to position them accordingly in order that they provide a signal representative of the velocity of the helicopter with respect to the air in the North-South direction and a signal representative of the velocity of the helicopter with respect to the air in the East-West direction, respectively.

A signal representative of the base air speed is obtained by rotating a knob 20 in accordance with the vector difference of the base ground speed and the wind velocity. The knob 20 is connected to a wiper arm of a potentiometer 21 in order that the output of the potentiometer 21 is a signal having an amplitude representative of the magnitude of the base air speed which is applied to the stator winding of a base resolver 22. The quadrature rotor windings of the resolver 22 are connected to a knob 23 for rotation in accordance with the direction of the base air speed. The output of the resolver 22 from the vertical winding is representative of the velocity of the base air speed in the North-South direction while the horizontal winding provides a signal representative of the velocity of the base air speed in the East-West direction.

To provide a signal representative of the velocity of the helicopter with respect to the base in the North-South direction, a summing circuit 24 has one of its input terminals connected to the wiper arm of the potentiometer 12 and another input terminal connected to the vertical winding of the resolver 22. To provide a signal representative of the velocity of the helicopter with respect to the base in the East-West direction, a summing circuit 25 has one of its input terminals connected to the wiper arm of the potentiometer 13 and another of its input terminals connected to the horizontal windings of the resolver 22. To provide a signal representative of the distance of the helicopter with respect to the base in the North-South direction, an integrating means 26 has its input terminal connected to the summing circuit 24. The integrating means 26 may be a conventional electromechanical integrating unit. Similarly, to provide a signal representative of the distance of the helicopter with respect to the base in the East-West direction, an integrating means 27 has its input terminal connected to the summing circuit 25.

The output of the summing circuit 24 is also connected to the vertical stator winding of a course velocity resolver 30 while the output of the summing circuit 25 is also connected to the horizontal stator winding of the resolver 30. The quadrature rotor windings of the resolver 30 are connected to be rotated by a knob 31 in accordance with the on-course bearing in order to provide a signal representative of the velocity of the helicopter in the on-course direction from the vertical rotor winding and a signal representative of the velocity of the helicopter in the cross-course direction from the horizontal rotor winding which signals are applied in a manner to be described later.

The range of the target, which in this example is the distance from the base to the destination, is set in by rotating a knob 32. By connecting the wiper arm of a potentiometer 33 to the knob 32, a signal is provided having an amplitude representative of the target range. This signal is applied to the stator winding of a target resolver 34 which has its quadrature rotor windings connected to be rotated by a knob 35 in accordance with the bearing of the target. By this arrangement, a signal representative of the distance to the target from the base in the North-South direction is provided from the vertical rotor winding of the resolver 34 while a signal representative of the distance from the base to the target in the East-West direction is obtained from the horizontal rotor winding thereof.

To obtain a signal representative of the distance from the helicopter to the target in the North-South direction, a summing circuit 36 has one of its input terminals connected to the integrating means 26 and another of its other input terminals connected to the vertical rotor winding of the resolver 34. To provide a signal representative of the distance of the helicopter to the target in the East-West direction, a summing circuit 37 has one of its input terminals connected to the integrating means 27 while another of its input terminals is connected to the horizontal rotor winding of the resolver 34.

The signal representative of the distance of the helicopter to the target in the North-South direction is applied to a vertical stator winding of a distance course resolver 40 while the distance from the helicopter to the target in the East-West direction signal is applied to the horizontal stator winding of the resolver 40. The quadrature rotor windings of the resolver 40 are connected for rotation in accordance with the rotation of the knob 31 to provide signals representative of the distance from the helicopter to the target in the on-course direction and in the cross-course direction from the vertical and horizontal rotor windings, respectively. A visual indication of the on-course distance to the destination may be provided on a counter 41.

The wiper arm of the potentiometer 21 is also connected to an input terminal of a summing circuit 44 while the other input terminal of the summing circuit 44 is connected to the vertical rotor winding of the resolver 40. The output of the summing circuit 44 is the algebraic summation of its input signals and is connected to an input terminal of a variable limiting means 45.

The function of the variable limiting means 45 is to limit the amplitude of its input signal in accordance with a selected air speed. The selected air speed is determined by the rotation of a knob 46 which is connected to the wiper arm of a potentiometer 47. The signal from the potentiometer 47 has an amplitude representative of the desired maximum air speed. This signal is applied to the variable limiting means 45 in such a manner that the output from means 45 is limited to command not more than the desired maximum air speed. This may be accomplished for example by applying the maximum desired air speed signal as a grid bias signal or as a cathode bias signal to prevent the amplitude of the output signal from means 45 from exceeding a predetermined maximum. The output signal of means 45 is proportional to the algebraic summation of the input signals to summing circuit 44 and is connected to the pitch control channel 50 of a helicopter flight director 51 of the type described in detail in the aforementioned Patent 2,845,623.

The indicator 52 of the helicopter flight director 51 has a normally horizontal bar 53 and a normally vertical bar 54 that are moved relative to a central index 55 for indicating the normally zero signal position of the indicator. The indicator 52 further includes a small normally horizontal pointer 56 which moves relative to the central index 55 or, if desired, a separate index or series of indices 57 may be provided in the form of dots in order to facilitate presentation of the motion of the pointer 56. In addition, a small normally vertical pointer 60 is provided which moves relative to the central index 55 or indices 61.

When the indicator 52 is utilized with a helicopter, movement of the horizontal bar 53 above and below the index 55 is indicative of the amount and direction of fore and aft movement of the cyclic stick (not shown) required to produce a commanded craft pitch attitude which due to the peculiar characteristics of helicopters also controls the fore and aft air speed of the craft. Movement of the vertical bar 54 to the right or left of the index 55 is indicative of the amount and direction of right-left control of cyclic stick required to produce a commanded craft roll angle. Similarly, movement of the pointer 56 above and below the index 55 or relative to the indices 57 is indicative of a required up and down movement of collective pitch stick (not shown) required to produce a commanded change in craft altitude. Movement of the pointer 60 to the right or left of the index 55 or indices 61 is indicative of the amount of right or left movement of the pedal bars (not shown) required to produce a commanded change in craft yaw attitude.

Movement of the bars 53, 54 and pointers 56, 60 is controlled in accordance with a plurality of signals to be described. The horizontal bar 53 is controlled by a signal responsive means such as a meter movement 62 which is connected to be responsive to the signal from the pitch control channel 50. The velocity on-course signal from the vertical rotor winding of the resolver 30 is applied to the altitude control channel 63 of the helicopter flight director 51 to energize a meter movement 64 that drives the pointer 56.

The velocity cross-course signal from the horizontal rotor winding of the resolver 30 is applied to an input terminal of a summing circuit 70. The distance cross-course signal from the horizontal rotor winding of the resolver 40 is applied through a limiting means 71 and then to the other input terminal of the summing circuit 70. The output of the summing circuit 70 which is the algebraic summation of its input signals is connected to the roll control channel 72 and to an input terminal of the yaw control channel 73. The signal applied to the roll and yaw control channels 72 and 73 is operated on as a function of air speed in a manner described in detail in the aforementioned Patent 2,845,623 to provide coordinated control in roll and yaw. The output of the roll control channel 72 is connected to energize a meter movement 74 which positions the vertical bar 54 accordingly. Similarly, the output of the yaw control channel 73 is connected to energize a meter movement 75 which positions the vertical pointer 60.

In the operation of the present invention, the knob 20 is set to the base air speed and the knob 23 is set to the base air speed direction. The knob 31 is set to the on-course bearing, the knob 32 is set to the target range, the knob 35 is set to the target bearing, and the knob 46 is set to the selected air speed. As the helicopter begins the flight to the destination and during the initial portion of the flight, the algebraic summation of the signals applied to the summing circuit 44 exceeds the desired air speed, which the pilot has selected by rotating the knob 46. By means of the variable limiting means 45, the summated signal from summing circuit 44 is limited in order that the horizontal bar 53 is deflected an amount proportional to the selected maximum air speed. As the pilot pitches the aircraft to attain the desired speed, and as the air speed of the craft increases, the bar 53 will return towards the centered position and will be centered when the aircraft is flying at the selected maximum air speed. By maintaining the bar 53 centered, i.e., aligned with the index 55, the pilot is enabled to control the aircraft to fly it at a maximum constant speed during the initial portion of the flight.

As the aircraft approaches the destination and the combined signal from the summing circuit 44 is less than the limit established by means 45, the bar 53 will deflect in the opposite direction indicating that the pilot should pitch the aircraft to reduce the air speed. Thus, the pilot is enabled to control the airplane to gradually reduce the air speed in proportion to the remaining distance to the destination, ultimately arriving at a predetermined speed. In the embodiment shown, at the destination, the helicopter is controlled to fly at the same air speed as the moving base by means of the signal from the potentiometer 21 in order that the helicopter will maintain a predetermined constant distance from the moving base as would be particularly useful in anti-submarine warfare where an aircraft carrier is the moving base.

During the initial portion of the flight to the destination the air speed is maintained at a constant maximum as described above. By utilizing the air speed of the helicopter in the on-course direction, i.e., velocity on-course, in the altitude control channel as shown, the helicopter is also controlled to fly at a constant altitude while it is flying at a constant air speed. The movement of the horizontal pointer 56 will be similar to that of the horizontal bar 53. As the aircraft approaches the destination and the air speed is being gradually reduced in proportion to the remaining distance to the destination, the pointer 56 is deflected to indicate that the pilot should also control the collective pitch stick to reduce the altitude accordingly. Thus, at the destination the helicopter is controlled to a predetermined altitude. In the embodiment shown, when the helicopter is maintaining a constant distance from a moving base the controlled altitude is proportional to the base air speed.

The operation of the vertical bar 54 and the vertical pointer 60 is similar to that described in the aforementioned Patent No. 2,845,623.

Alternatively, for example, where the helicopter is being controlled between two stationary heliports, signals representative of the wind velocity and wind direction at the destination heliport may be inserted into the system by means of the knobs 20 and 23 in lieu of the base air speed and base air speed direction. Further, the signal representative of the distance on-course from the vertical rotor winding of the resolver 40 may be utilized as the input to the altitude control channel 63 in lieu of the velocity on-course signal from the resolver 30. In this case, the predetermined speed is gradually reduced to zero ground speed or equal to the wind velocity at the destination and the altitude is gradually reduced as a function of the remaining on-course distance to the destination until a landing is effected at the altitude of the heliport. A conventional means not shown may be utilized to compensate for the variations in altitude from one heliport to another.

Alternatively, the system may be adapted to utilize signals representative of ground speed as sensed, for example, by Doppler radar, in lieu of the above-mentioned air speed signals. This alternative may be preferable when the base is fixed.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A navigation system for aircraft by means of which the speed of said aircraft may be controlled to a desired value along the route to a destination comprising means for providing a signal having a characteristic representative of the distance from said aircraft to said destination, means including limiting means for limiting said characteristic of said distance-to-destination signal in excess of a given amount as a function of a predetermined speed of said aircraft, and signal responsive means responsive to the output of said limiting means for providing an output indicative of a required change in aircraft condition to cause said aircraft to approach and maintain the desired speed in order that said aircraft may be controlled to fly at a predetermined constant speed over an initial portion of the distance to the destination in accordance with the limited signal and thereafter at a speed proportional to said characteristic of said signal below the established limit.

2. A flight control system for aircraft for enabling said craft to fly at a predetermined constant speed over a first predetermined portion of the total distance to be travelled and for gradually reducing the speed over the remaining portion of said distance comprising means for providing a signal having an amplitude representative of the distance from the craft to said destination, means including limiting means for limiting the amplitude of said distance-to-destination signal in excess of a predetermined amplitude in accordance with a selected speed, and signal responsive means responsive to the output of said limiting means for providing an output indicative of a required change in the craft condition to cause said craft to approach and maintain said selected speed over the first portion of the total distance and thereafter maintain a speed proportional to said signal over the remaining portion of the total distance.

3. A navigation system for rotary wing aircraft by means of which the air speed of said aircraft may be controlled to a desired value along the route to a destination comprising means for providing a signal representative of the distance from said aircraft to said destination, means including limiting means for limiting said distance-to-destination signal in excess of a given amount as a function of a predetermined air speed of said aircraft, and signal responsive means responsive to the output of said limiting means for providing an output indicative of a required change in aircraft pitch attitude to cause said aircraft to approach and maintain the desired air speed whereby the aircraft may be controlled to fly at a predetermined constant air speed over an initial portion of the distance to the destination in accordance with the limited signal and thereafter at an air speed proportional to said signal below the established limit.

4. A navigation system for rotary wing aircraft by means of which the aircraft may be controlled to maintain a first predetermined speed over an initial portion of a distance to be travelled to a destination and over the remaining portion of said distance the speed is gradually reduced to a second predetermined speed comprising means for providing a signal representative of the distance from the craft to said destination, means for providing a signal representative of the absolute wind velocity, summing means responsive to said distance-to-destination signal and said wind velocity signal for providing a signal in accordance with the algebraic summation thereof, means including limiting means for limiting said algebraic summation signal in excess of a predetermined value in accordance with a selected speed, and signal responsive means responsive to the output of said limiting means for providing an output indicative of a required change in the craft pitch attitude to cause said craft to approach and maintain a desired speed.

5. A navigation system for rotary wing aircraft operating from a moving base by means of which the aircraft may be controlled to maintain a first predetermined air speed over an initial portion of a distance to be travelled to a destination and over the remaining portion of said distance the air speed is gradually reduced to a second predetermined air speed comprising means for providing a signal representative of the distance from the craft to said destination, means for providing a signal representative of the air speed of said moving base, summing means responsive to said distance-to-destination and base air speed signals for providing a signal in accordance with the algebraic summation thereof, means including limiting means for limiting said algebraic summation signal in excess of a predetermined value in accordance with a selected air speed, and signal responsive means responsive to the output of said limiting means for providing a measure indicative of a required change in the craft pitch attitude to cause said craft to approach and maintain a desired air speed whereby at the destination said aircraft may be controlled to fly at said base air speed.

6. A navigation instrument for aircraft for enabling the craft to fly at a predetermined desired altitude over a first portion of the distance to the destination and a gradually decreasing desired altitude over the remaining portion of the distance to the destination comprising means for providing a signal representative of the distance to the destination, means for selecting a maximum speed and providing a signal proportional thereto, means responsive to said maximum speed signal and to said distance-to-destination signal for limiting the latter signal in excess of a predetermined value in accordance with the selected maximum speed signal, first signal responsive means connected to said limiting means for providing a first output indicative of a required change in craft condition to cause said craft to maintain said selected maximum air speed over the portion of the distance to the destination where said distance-to-destination signal is limited and to maintain an air speed proportional to the distance to the destination where said distance-to-destination signal is below said limit, means for providing a signal representative of the on-course velocity of said craft, and second signal responsive means responsive to said on-course velocity signal for providing a second output indicative of a required change in craft altitude to cause said craft to maintain said desired altitude in accordance with said on-course velocity signal.

7. A navigation instrument for aircraft by means of which said aircraft may be controlled to maintain a first predetermined speed and altitude over an initial portion of a distance to be travelled to a destination and over the remaining portion of said distance the speed and altitude are gradually decreased comprising means for providing a signal representative of the distance from the craft to said destination, means including limiting means for limiting the amplitude of said distance-to-destination signal in excess of a predetermined amplitude as a function of a predetermined speed of said aircraft, first signal responsive means responsive to the output of said limiting means for providing a first output indicative of a required change in craft condition to cause said aircraft to approach and maintain said first predetermined speed over said initial portion of said distance and thereafter maintain a speed in accordance with said distance-to-destination signal, means for providing a signal representative of the speed of said aircraft, and second signal responsive means responsive to said speed signal for providing a second output indicative of the change required in craft altitude to cause said craft to approach and maintain a desired altitude whereby over said first portion of said distance the speed and altitude may be maintained substantially constant and maximum and thereafter they may be gradually decreased.

8. A navigation system for rotary wing aircraft by means of which the aircraft may be controlled to maintain a first predetermined air speed and altitude over an initial portion of a distance to be travelled to a destination and over the remaining portion of said distance the air speed and altitude are gradually reduced to a second predetermined air speed and altitude comprising means for providing a signal representative of the distance from the craft to said destination, means for providing a signal representative of the absolute wind velocity, summing means responsive to said distance-to-destination signal and said wind velocity signal for providing a signal in accordance with the algebraic summation thereof, means including limiting means for limiting said algebraic summation signal in excess of a predetermined value in accordance with a selected air speed, and first signal responsive means responsive to the output of said limiting means for providing a first output indicative of a required change in the craft pitch attitude to cause said craft to approach and maintain a desired air speed, means for providing a signal representative of the speed of said aircraft, and second signal responsive means responsive to said speed signal for providing a second output indicative of the change required in craft altitude to cause said craft to approach and maintain a desired altitude.

9. A navigation system for rotary wing aircraft by means of which the aircraft may be controlled to maintain a first predetermined air speed and altitude over an initial portion of a distance to be travelled from a moving base to a destination and over the remaining portion of said distance the air speed and altitude are gradually reduced to a second predetermined air speed and altitude comprising means for providing a signal representative of the distance from the craft to said destination, means for providing a signal representative of the air speed of said moving base, summing means responsive to said distance-to-destination signal and said base air speed signal for providing a signal in accordance with the algebraic summation thereof, means including limiting means for limiting said algebraic summation signal in excess of a predetermined value in accordance with a selected air speed, first signal responsive means responsive to the output of said limiting means for providing a first output indicative of a required change in the craft pitch attitude to cause said craft to approach and maintain a desired air speed, means for providing a signal representative of the speed of said aircraft, and second signal responsive means responsive to said speed signal for providing a second output indicative of the change required in craft altitude to cause said craft to approach and maintain a desired altitude.

References Cited in the file of this patent

UNITED STATES PATENTS 2,845,623    Iddings _____ July 29, 1958

FOREIGN PATENTS 825,009    Great Britain _____ Dec. 9, 1959